June 24, 1958 E. F. SNYDER 2,840,240
SAND REMOVING APPARATUS
Filed Dec. 20, 1956
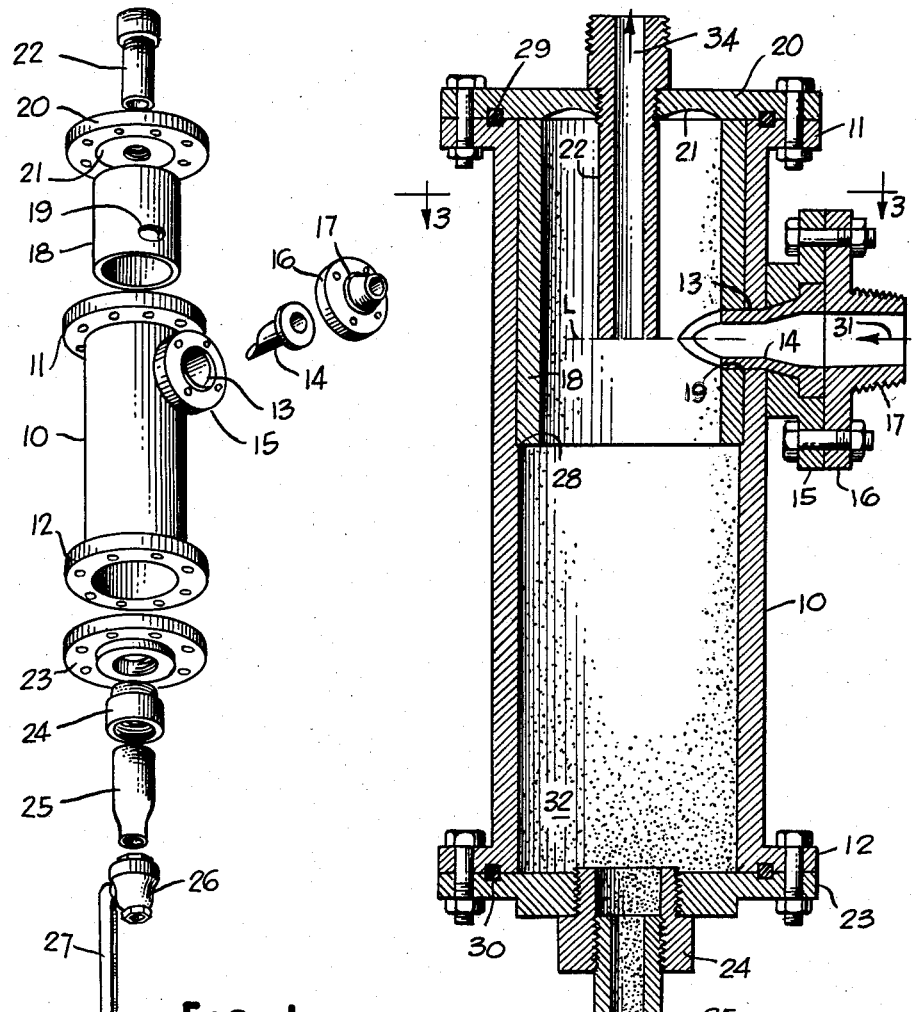
FIG. 1.
FIG. 2.
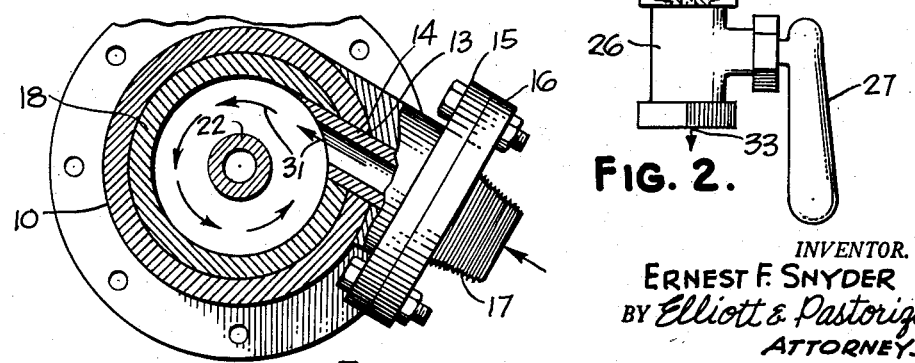
FIG. 3.
INVENTOR.
ERNEST F. SNYDER
BY Elliott & Pastoriza
ATTORNEYS

United States Patent Office 2,840,240
Patented June 24, 1958

2,840,240

SAND REMOVING APPARATUS

Ernest F. Snyder, Long Beach, Calif., assignor to Begs Oil Tool Rentals, Inc., a corporation of California Application December 20, 1956, Serial No. 629,588

2 Claims. (Cl. 210—512)

This invention relates generally to sand removing apparatus and more particularly to an improved centrifugal separator for removing sand from oil well drilling mud.

Centrifugal separators for removing both coarse and fine solid particles from liquids are well known in the art and generally comprise a closed chamber within which the contaminated liquid is caused to swirl or rotate at a sufficient speed to throw the heavier particles toward the inside peripheral walls of the chamber. These particles then fall by gravity towards the bottom of the chamber and the cleaned liquid is removed from the center portion through a suitable outlet pipe. Such separators are extremely useful in oil well drilling operations for removing sand from drilling mud. Sand in the drilling mud has a deleterious effect on the various control valves and conduits through which the mud is passed.

Present day sand separators employed in the oil industry are generally effective in removing a large percentage of sand from the drilling mud. However, most of these devices are extremely bulky and complicated in structure. Further, they are subject to considerable wear as well as breakdown as a consequence of the many different component parts making up the device. Usually, when certain portions of the apparatus become sufficiently worn, it is necessary to replace the entire sand separating equipment. Such operation is not only time consuming but is relatively costly.

Bearing the above in mind, it is a primary object of the present invention to provide a greatly improved sand separating device for removing particles from oil well drilling mud which is extremely rugged and employs a minimum number of component parts whereby it is economical to manufacture and extremely reliable in operation.

More particularly, an object is to provide a centrifugal type sand separator of such rugged construction that it may be operated under extremely high pressures to attain correspondingly high velocities and thereby enable the separation of very fine sand up to and even better than two hundred mesh.

Still another extremely important object of this invention is to provide an improved sand separator which is so designed that the component parts thereof subject to the most wear may be easily replaced whereby maintenance costs and time are minimized.

Briefly, these and many other objects and advantages of the present invention are attained by providing a cylindrical casing section having a tangential inlet opening intermediate its ends for introducing under extremely high pressure mud from which sand is to be removed. This casing is arranged to receive a sleeve liner axially through its upper end. Preferably, the casing is provided with an internal annular shoulder substantially midway between its ends for holding the sleeve against axial movement within the casing. A cover plate is then provided over the upper end of the casing in fluid tight engagement with the upper peripheral casing end. This cover plate in turn centrally supports an outlet pipe in co-axial alignment with the casing. The inner end of the outlet pipe terminates at a level corresponding to the tangential port opening.

The lower end of the cylindrical casing is similarly provided with a lower cover member to provide a fluid tight peripheral seal. This lower member in turn carries a discharge conduit and valve structure whereby the pressure within the casing may be controlled by the valve. The valve is arranged to control the rate of discharge flow of the sand and sludge separated from the liquid mud and thereby control the pressure within the casing for optimum operation in accordance with the mud weight and contemplated contaminants introduced through the tangential port. Preferably, the mud is introduced at a pressure of 150 to 300 pounds per square inch and is caused to swirl at an extremely high velocity. It is this high velocity which enables very fine sand particles to be separated from the liquid. The provision of the replaceable liner enables the device to be operated for long periods of time with a minimum maintenance expense. A feature of the invention resides in the provision of an annular groove on the underside of the cover member for minimizing the abrasive action of the swirling liquid during the separating process.

A better understanding of the invention will be had by referring to a preferred embodiment thereof as illustrated in the accompanying drawings, in which:

Figure 1 is an exploded perspective view of the basic component parts of the sand separating apparatus of this invention;

Figure 2 is an enlarged elevational cross section of the apparatus in assembled position; and, Figure 3 is a cross section taken in the direction of the arrows 3—3 of Figure 2.

Referring first to the exploded view of Figure 1, the sand separating device is illustrated as comprising a main casing section 10 in the form of a cylinder provided with upper and lower end flanges 11 and 12. Intermediate the end flanges 11 and 12, there is provided a tangential inlet port opening 13 adapted to receive an inlet nozzle 14 held securely in position by a flange seat 15 and mating flange 16. The flange 16 includes an inlet coupling 17 for receiving a suitable line from a high pressure mud pump whereby mud may be passed tangentially into the cylindrical casing 10.

As shown in Figure 1 above the casing 10, there is provided a sleeve member serving as a liner 18 adapted to be axially received through the top opening of the casing 10. This sleeve is in turn provided with an opening 19 positioned such that it will register with the tangential port opening 13 when in assembled position within the casing 10. A top cover member 20 is then arranged to seat on the top flange 11 in fluid tight peripheral engagement therewith. The upper flange cover 20 includes an annular groove 21 on its underside the purpose for which will become clearer as the description proceeds. As shown, the cover 20 is provided with a central opening for supporting and receiving an outlet pipe 22.

Referring now to the components below the cylindrical casing section 10 as shown in Figure 1, there is illustrated a lower cover member 23 provided with a central opening for receiving a fitting 24 in turn adapted to support a discharge conduit 25. The discharge conduit 25 is provided with a restricted portion adapted to be coupled to a control valve 26 adjustable by means of an operating handle 27.

In Figure 2, the assembled sand separating apparatus is shown in detail. The sleeve liner 18 has an outside diameter slightly larger than the inside diameter of the cylindrical casing 10 and in order that the sleeve liner may be axially inserted in the upper end of the casing, an inside upper portion thereof is enlarged to accommodate the liner. An annular shoulder is thus provided at 28 whereby axial movement of the liner within the cylindrical casing is prevented. As also indicated in Figure 2, there are provided O-rings 29 and 30 at the upper and lower ends of the cylindrical casing 10 to insure a fluid tight peripheral engagement between the cover members and the ends of the casing. Suitable bolts are illustrated for securing these cover members to the casing ends. It will be noted that the outlet pipe 22 is threadedly received in the central opening of the cover member 20 whereby it may be readily removed in disassembling the device. In a like manner, the discharge fitting 24 is threadedly received in the lower cover member 23 for easy disassembly.

Referring now to both Figures 2 and 3, the operation of the improved sand separating apparatus of this invention will be described. Mud from which sand is to be separated is introduced into the inlet nozzle 14 as indicated by the arrow 31. This mud is preferably under a pressure of 150 to 300 pounds and is supplied through a mud pump (not shown). Because of the tangential arrangement of the port opening 13 in co-operation with the nozzle 14, the incoming mud 31 will swirl about the inner cylindrical walls of the liner 18 as clearly indicated in Figure 3. The velocity of this incoming mud 31 is extremely high as a result of the high pressure employed in operating the device and a relatively large centrifugal force acting on sand particles within the mud is established. Referring again to Figure 2, these sand particles are urged outwardly against the inner wall of the liner 18 and are slowed down by frictional engagement with the liner. As the particles lose their high velocity, they will settle as by gravity into the lower portion of the cylindrical casing 10 and pile up as indicated at 32.

The cleaned mud will be at the central portion of the cylindrical casing 10 and is withdrawn through the outlet pipe 22 as indicated by the arrow 34. Preferably, the outlet pipe 22 terminates within the sleeve liner 18 at a level L corresponding with the inlet port opening 13. If desired, a suction may be applied to the outlet pipe 34 to aid in the removal of the cleaned mud but such suction is not necessary, the pressure differential between the mud entering into the inlet nozzle 14 and discharging at the outlet pipe 34 being sufficient to insure that the cleaned mud will be expelled through the outlet pipe.

The removal of the cleaned mud from the outlet pipe 34 can be controlled by means of the discharge valve 26. Thus, for example, if the discharge valve 26 is closed down slightly the discharge rate of the mud, sludge and sand particles settling within the conduit 25 is decreased and the pressure differential between the incoming liquid mud at 31 and the interior of the casing 10 will be decreased. The pressure differential between the interior of the casing 10 and the outflow end of the discharge 34 will be correspondingly increased thereby causing a greater outflow. Because of the former mentioned decrease in differential pressure, the swirling action will not take place at as high a velocity as is the case when the discharge valve 26 is opened up to its full extent and as a result, the finer sand particles will not necessarily be removed but will pass up with the mud out the outlet pipe 34. Thus, closing down of the valve 26 should only be done when it is desired to simply remove the heavier and coarser particles from the mud. The advantage in enabling the valve 26 to be closed down is that the coarser particles may be rapidly removed and the flow rate of the apparatus speeded up for this special operation.

In the case where it is desired to remove all of the particles including the very fine particles, the discharge valve 26 should be opened as far as possible thereby relieving the building up of the pressure within the cylindrical casing 10 resulting in a greater differential pressure between the inlet mud 31 and the interior of the casing 10. As a result, the swirling velocity is greatly increased to thereby insure that even the lighter and finer sand particles will be removed. In such case, there is a greater discharge at 33 from the discharge valve 26 and the rate of removal from outlet pipe 22 is decreased but the mud removed at 34 will be cleaner and free from fine particles even down to a size of 200 mesh.

The provision of the annular groove 21 on the underside of the upper cover member 20 provides a smoothly contoured dome shaped annular portion in which the swirling action may take place with less wear on the cover member. Thus, the abrasive action of the sand is distributed over a larger area by grooving out the top cover member in contact with the liquid as indicated by the annular groove 21 than would be the case where simply a flat surface presented forming a sharp corner with the upper inner walls of the sleeve 18. The sleeve, on the other hand, will be subject to abrasive wear during the separating process but because of the described construction of the casing 10 and the upper cover 20, it may be readily removed and replaced by a new sleeve linear in a short period of time.

It will thus be appreciated that the present invention provides an extremely rugged and simple sand separating apparatus. There are employed a minimum number of components which may be ruggedly and reliably secured together in sealed relationship. The various fittings such as the outlet pipe 22 and discharge fitting 24 and conduit 25 are arranged to threadedly engage the upper and lower cover members 20 and 23 whereby they may be disassembled and the entire apparatus readily cleaned. Because of the feature of a replaceable liner, the present apparatus may be operated for long periods of time with a minimum of maintenance expense and time. Further, because of the very high pressures employed in injecting mud to be cleaned into the cylindrical casing 10, very fine particles of sand may be effectively removed and in actual practice, it has been found that 98% of the sand in a rotary drilling mud down to sizes of 200 mesh and even better have been effectively removed.

Minor modifications within the scope and spirit of the present invention will occur to those skilled in the art. The sand separating apparatus described is, therefore, not to be thought of as limited to the exact structure set forth for illustrative purposes.

What is claimed is:

1. A device for removing particles carried in a drilling mud comprising, in combination: a cylindrical casing section having a tangential port opening through its side; a cylindrical sleeve of shorter axial length than said casing adapted to be telescoped within the upper portion of said casing to provide an internal liner about said upper portion, said sleeve having a tangential opening registering with said tangential port; means intermediate the upper and lower ends of said casing for securing said sleeve from axial movement within said casing; an upper cover member adapted to cover the upper peripheral end of said casing in fluid tight engagement, said upper cover member having a central opening and an annular groove on its undersurface to provide an increased area portion in contact with drilling mud circulating about the interior of said sleeve; an outlet pipe adapted to be received and supported within said central opening in said cover, said outlet pipe extending axially within said casing section and sleeve and terminating at a point at substantially the same level as said tangential port opening; a lower cover member adapted to cover the lower peripheral end of said casing in fluid tight engagement; a discharge means supported by said lower cover member for passing said particles from the lower end of said casing section; and control valve means in said discharge means for controlling the rate of discharge flow.

2. A device according to claim 1, in which said means supporting said sleeve from axial movement within said casing comprises an internal annular shoulder dimensioned to support the lower end of said cylindrical sleeve liner whereby the axial extent of movement of said liner within said cylindrical casing in a downward direction is limited.

References Cited in the file of this patent

UNITED STATES PATENTS 2,776,053     Krebs _____ Jan. 1, 1957